Sept. 6, 1938.  J. C. WHITESIDE  2,129,252
FARM PRODUCTS LOADING AND DISTRIBUTING DEVICE
Filed Sept. 26, 1936
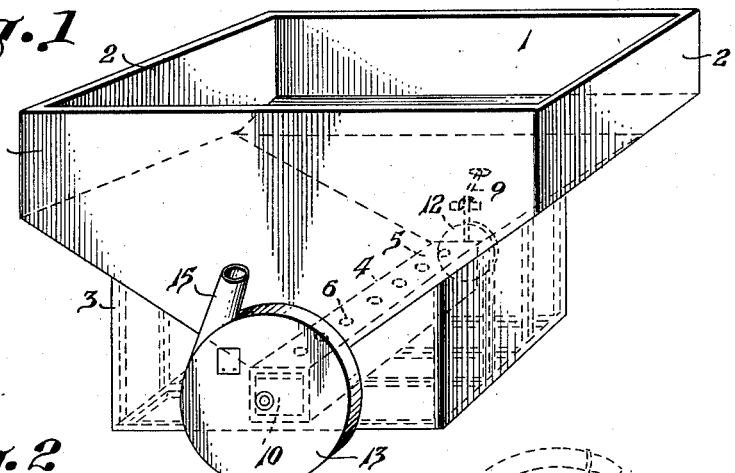
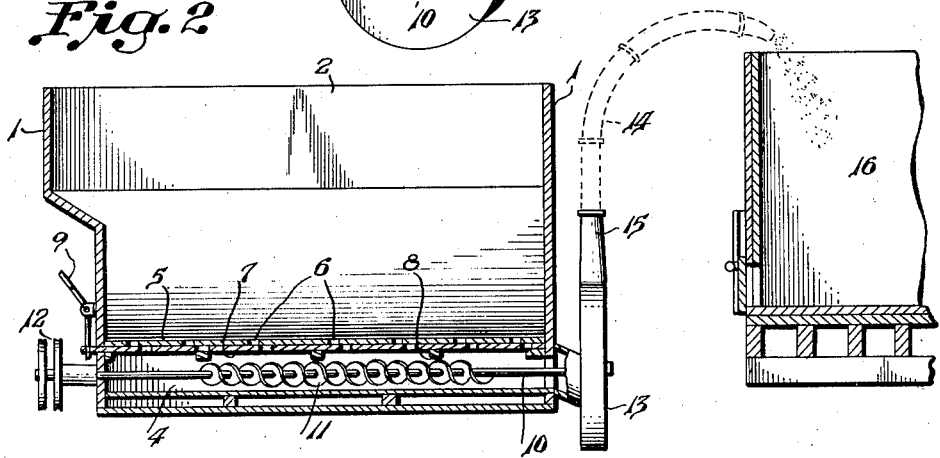
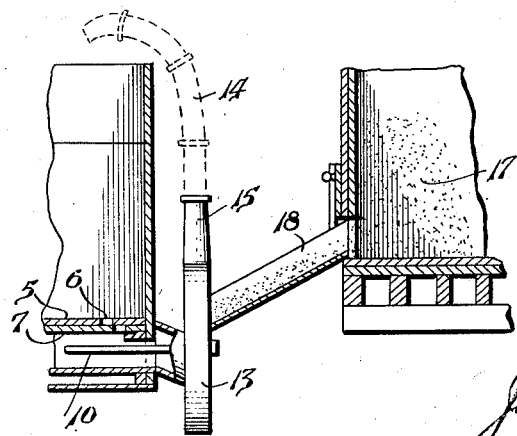
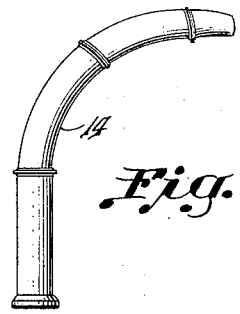
Inventor
James Carson Whiteside Patented Sept. 6, 1938

2,129,252

UNITED STATES PATENT OFFICE 2,129,252

FARM PRODUCTS LOADING AND DISTRIBUTING DEVICE

James Carson Whiteside, Sceptre, Saskatchewan, Canada

Application September 26, 1936, Serial No. 102,734
In Canada February 3, 1936

1 Claim. (Cl. 302—17)

The invention relates to improvements in loading and distributing devices for use in transferring products of the land from the field to a truck, from the truck to a storage bin, from the storage bin to an elevator, and for other relative purposes, and the object of my invention is to provide an efficient and convenient means for transferring such products by utilizing in a unitary assembly a box-shaped, hopper-bottomed container mounted on a truck in combination with a screw-conveyor and a delivery grain blower fan.

I attain this object by the device and mechanism illustrated in the acompanying drawing, in which—

Figure 1 is a perspective view of container and hopper.

Figure 2 is a longitudinal cross section through centre of container and transferring mechanism.

Figure 3 is a section of bin and blower fan to illustrate loading from storage.

Figure 4 shows the distributing spout in detail.

Similar numerals refer to similar parts throughout the several views.

A rectangular container for the transference of field products, which may be used on a truck, has two vertical sides 1 and two remaining opposing sides 2 which latter are vertical for a short distance and continue convergingly at a downward and inward inclination, to form a hopper bottom for the said container.

In Figure 1 is shown a frame stand 3 for supporting the weight of the container, and for conveniently carrying the container on a truck. Running longitudinally along the bottom of the container or hopper at the convergence of the two sloping sides is a trough 4 partitioned from the hopper by a floor 5, the said floor having therein a series of holes or ports 6 for the passage of the contents of the hopper into the bottom trough 4. Regulation of the flow of the contents of the container is controlled by a slidable bottom board 7 supported on slide bearers 8 disposed within the said trough 4. The said board 7 is slidably moved to open and close the apertures or ports 6. The movements of this board are controlled by a hand operated lever 9 mounted on the exterior of the hopper. A screw conveyor, consisting of a shaft 10 and screw blades 11, is disposed throughout the longitudinal length of the said trough 4, being bearably mounted therethrough, which conveyor shaft is rotated by means of one or more power driven pulleys 12 mounted externally with respect to the hopper and the trough 4. The rotation of the conveyor is such that the contents of the hopper passing through the ports 6 are conveyed away from the trough for disposal as desired.

A blower fan 13 is attached to the outboard delivery end of the conveyor shaft 10 and receives the conveyed products direct from the said trough 4 through an intake opening in one side of the fan casing in the conventional manner. A flexible delivery spout 14 is connected to an outlet spout 15 on the blower fan 13, which spout directs the flow of products from the fan to a storage bin 16 or to any desired point for disposal of the contents of the hopper as desired.

Regulation of the quantity of the products passing through the ports 6 and fan 13 is maintained by the manipulation of the lever 9. The function of this device may readily be reversed and the hopper itself may be filled from an outside source, in which case it would be necessary to close the ports 6. This procedure is illustrated in Figure 3, where the contents of a bin 17 are allowed to flow down a chute 18 to enter the blower fan 13 through an intake opening at the opposite side of the fan casing from that previously mentioned, and the fan will deliver the contents of the storage bin 17 into the aforementioned container or hopper.

The uses of this device are therefore two-fold when it is considered that the container can be loaded from a storage bin or from the field direct, and also unloaded with the same operating machinery—a valuable consideration.

It is to be understood that whereas a rectangular container is referred to, this may be of any shape desired that will form a hopper for distribution to the screw-conveyor.

Having shown the preferred embodiment of my invention, I desire it to be understood that changes in the appearance generally may be resorted to without departing from the spirit of the invention and the scope of the appended claim.

Having thus described my invention, what I claim is:

The combination with a field produce hopper-shaped container for mounting on a truck, of a shaft supported screw-conveyor at the bottom of the container for use when unloading the said container, an outboard mounted blower fan attached to the shaft of the said screw-conveyor, a casing for the fan having an intake opening for receiving produce from the screw-conveyor and another intake opening for receiving produce from outside sources to deliver same into the said container, and means by pulleys attached to the shaft of the said screw-conveyor for driving the said blower fan, all as described.

JAMES CARSON WHITESIDE.